United States Patent
Rizzo Piazza Roncoroni et al.

(10) Patent No.: US 7,782,219 B2
(45) Date of Patent: Aug. 24, 2010

(54) DEVICE AND METHOD FOR PROTECTING AN ELECTRONIC APPLIANCE IN CRITICAL MOTION CONDITIONS, IN PARTICULAR IN CASE OF FALL

(75) Inventors: Alessandra Maria Rizzo Piazza Roncoroni, Abbiategrasso (IT); Michele Tronconi, San Martino Siccomario (IT); Fabio Pasolini, San Martino Siccomario (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 308 days.

(21) Appl. No.: 11/950,135

(22) Filed: Dec. 4, 2007

(65) Prior Publication Data

US 2008/0129526 A1 Jun. 5, 2008

(30) Foreign Application Priority Data

Dec. 5, 2006 (IT) ................ TO06A0866

(51) Int. Cl.
*G08B 21/00* (2006.01)
(52) U.S. Cl. ..................... 340/669; 340/686.1
(58) Field of Classification Search ................ 340/669, 340/541, 686.1, 440
See application file for complete search history.

(56) References Cited

U.S. PATENT DOCUMENTS

| 4,092,633 | A | * | 5/1978 | Fletcher et al. ............. 340/669 |
| 5,955,668 | A | | 9/1999 | Hsu et al. ................ 73/504.12 |
| 6,654,671 | B2 | * | 11/2003 | Schubert ..................... 340/440 |
| 7,319,383 | B2 | * | 1/2008 | Howard .................... 340/686.1 |
| 2006/0139790 | A1 | | 6/2006 | Iseri et al. |
| 2006/0152842 | A1 | | 7/2006 | Pasolini et al. |
| 2006/0268447 | A1 | | 11/2006 | Liao et al. |

FOREIGN PATENT DOCUMENTS

| EP | 1 253 399 | 10/2002 |
| EP | 1 365 211 | 11/2003 |

* cited by examiner

*Primary Examiner*—John A Tweel, Jr.
(74) *Attorney, Agent, or Firm*—Lisa K. Jorgenson; Robert Iannucci; Seed IP Law Group PLLC

(57) ABSTRACT

A device for protecting an electronic apparatus includes: a motion-detection device, for supplying at least one alert signal in response to conditions of motion of the protection device; a counter; a first logic circuit, for incrementing the counter in the presence of a first value of the alert signal, in a first operating condition; and a second logic circuit, for generating a protection signal on the basis of a count value of the counter. In addition, the first logic circuit is configured for decrementing the counter in the presence of a second value of the alert signal, in the first operating condition.

30 Claims, 6 Drawing Sheets

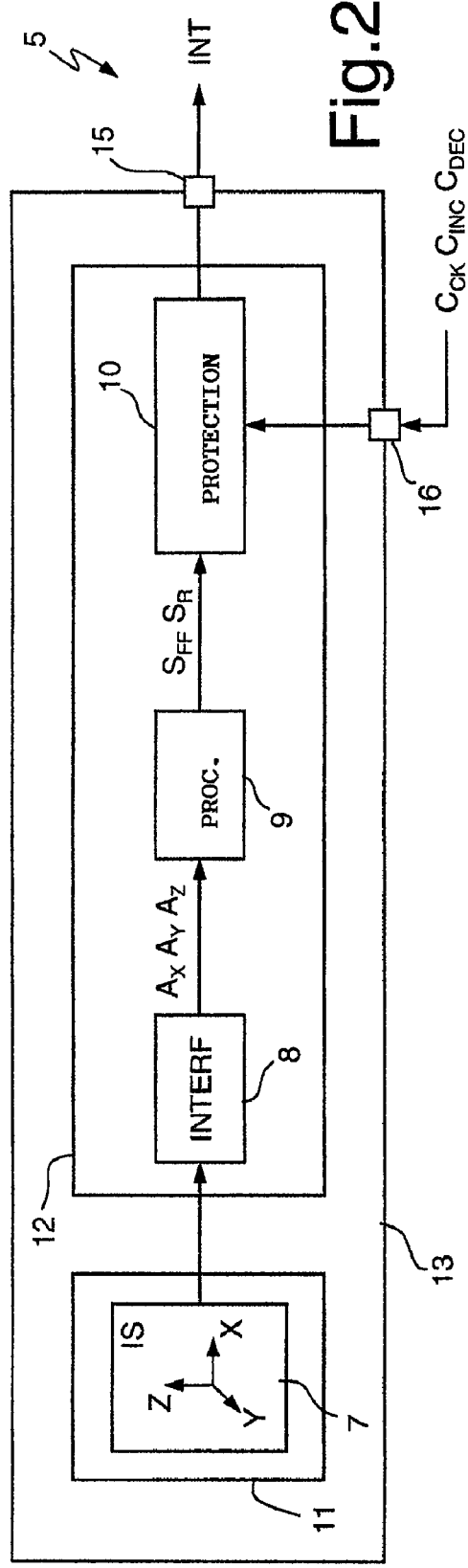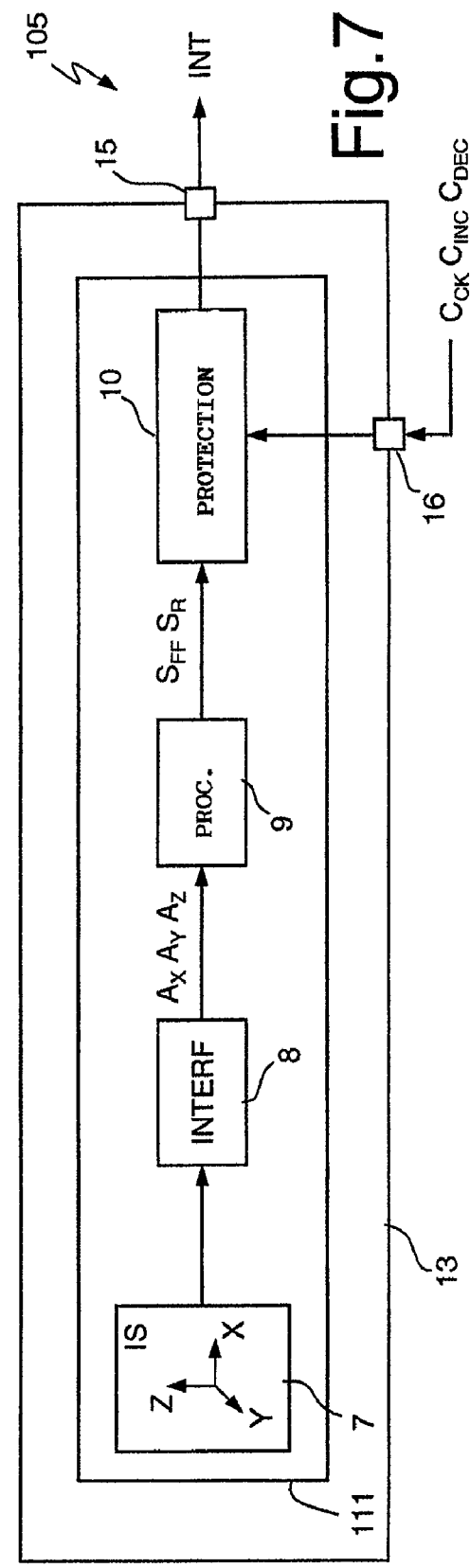

Fig.4

| | INT(K) | $S_{FF}$ OR $S_R$ | C=0 | C+ | C- | |
|---|---|---|---|---|---|---|
| 1 | 0 | 0 | 0 | 0 | 1 | DEC |
| 2 | 0 | 0 | 1 | 0 | 0 | STOP |
| 3 | 0 | 1 | 0 | 1 | 0 | INC |
| 4 | 0 | 1 | 1 | 1 | 0 | INC |
| 5 | 1 | 0 | 0 | 1 | 0 | INC |
| 6 | 1 | 0 | 1 | 1 | 0 | INC |
| 7 | 1 | 1 | 0 | 0 | 1 | DEC |
| 8 | 1 | 1 | 1 | 0 | 0 | STOP |

CONDITION $C=0$: $\begin{cases} 0 = \text{FALSE} \\ 1 = \text{TRUE} \end{cases}$

Fig.5

| | INT(K) | $C \geq C_{INT}$ | $C \geq C_W$ | INT(K+1) |
|---|---|---|---|---|
| 1 | 0 | 0 | -- | 0 |
| 2 | 0 | 1 | -- | 1 |
| 3 | 1 | -- | 0 | 1 |
| 4 | 1 | -- | 1 | 0 |

CONDITION $C \geq C_{INT}$: $\begin{cases} 0 = \text{FALSE} \\ 1 = \text{TRUE} \end{cases}$ CONDITION $C \geq C_W$: $\begin{cases} 0 = \text{FALSE} \\ 1 = \text{TRUE} \end{cases}$

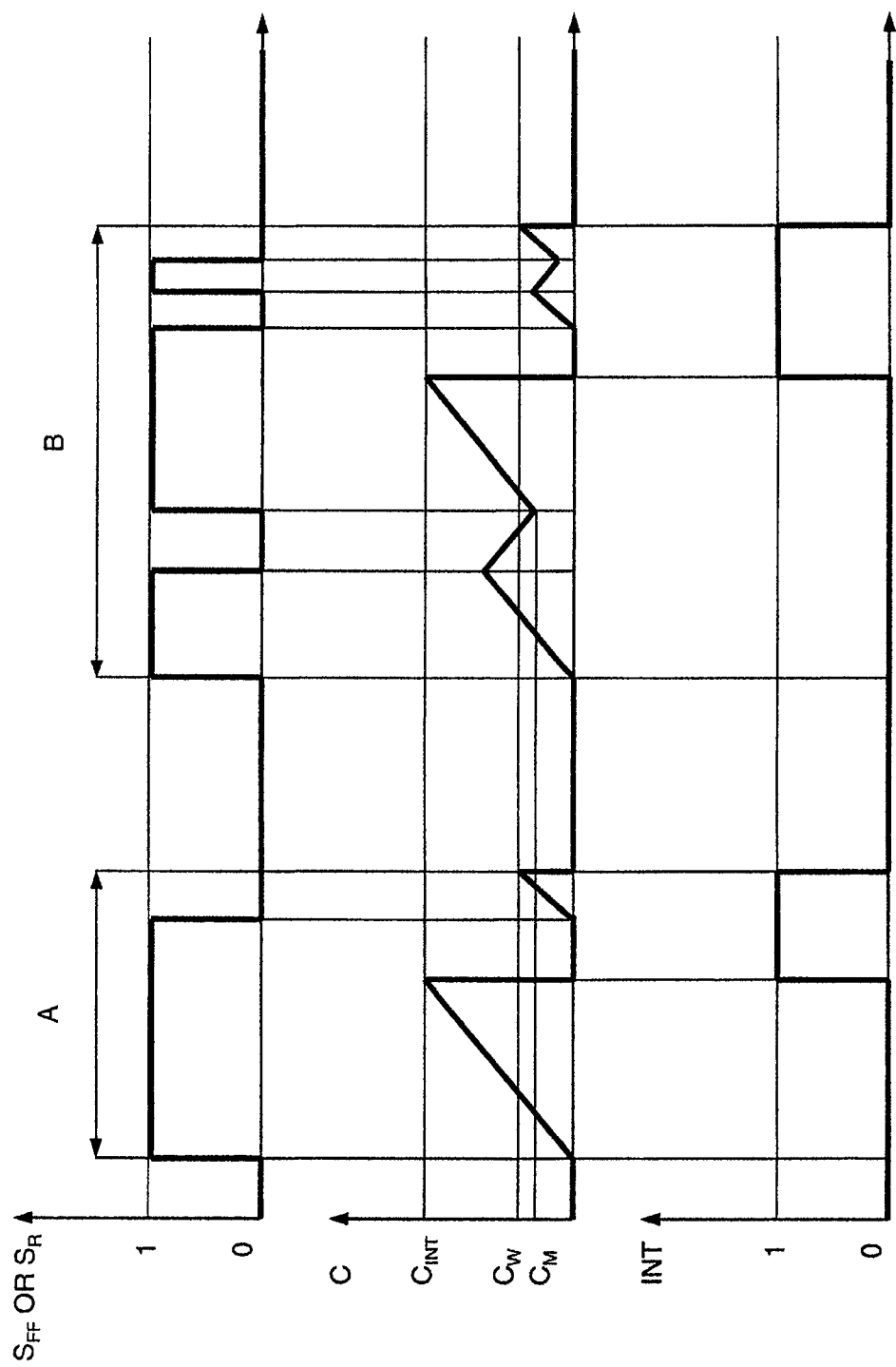

DEVICE AND METHOD FOR PROTECTING AN ELECTRONIC APPLIANCE IN CRITICAL MOTION CONDITIONS, IN PARTICULAR IN CASE OF FALL

TECHNICAL FIELD

The present disclosure generally but not exclusively relates to a device and to a method for protecting an electronic apparatus in critical conditions of motion, for example in the case of fall.

BACKGROUND INFORMATION

As is known, many portable electronic apparatuses comprise mobile mechanical parts that must be protected from impact because they can easily get damaged. For example, portable computers or laptops are equipped with hard disks provided with extremely delicate read and write heads, which, in the case of impact, can break or damage the magnetic surfaces where the data are stored.

In order to limit the damage due to accidental impact, in particular following upon a fall, it has been proposed to use protection devices based upon inertial sensors, which detect a critical condition of motion and enable the electronic apparatus to be brought in a timely way into a safety configuration. For example, a free-fall condition is promptly recognized by the inertial sensor because the effect of the gravitational force normally detected is substantially zero (situation of zero gravity). In the case of the hard disk of a portable computer, the heads are immediately parked in a safety area, reducing the risk of damage.

However, there are common but non-dangerous situations in which the inertial sensor can detect the absence of gravity or other anomalous conditions of motion for a short period of time. These situations, which can arise when the user is walking or when a portable computer is on the user's lap, should preferably not correspond to emergency measures. To discriminate non-dangerous events, known protection devices are provided with circuit blocks for checking whether the critical conditions of motion are protracted for at least for a threshold time interval. The emergency measures are hence activated only with the consent of said circuit blocks, after a time considered sufficiently long has elapsed. Otherwise, the count of the duration of the time interval is reset, and the electronic apparatus incorporating the protection device remains in its normal operating configuration.

In some cases, however, a temporary interruption of the critical conditions of motion can have drastic consequences. For example, if a user makes an unsuccessful attempt to stop the fall of an electronic apparatus that has slipped out of his grip, only managing to slow it down, it can happen that the emergency measures are not activated. The motion of the electronic apparatus could thus be broken down into various steps of free fall, which are all too short and of a duration shorter than the threshold time interval that enables recognition of the condition of danger. The electronic apparatus hence remains in the normal operating configuration, and the impact that ensues due to the fall can cause more or less serious damage to the parts that are not protected.

BRIEF SUMMARY

Embodiments of the present invention provide a device and a method for protecting an electronic apparatus that will enable the drawbacks described above to be overcome.

According to various embodiments of the present invention, a device and a method for protecting an electronic apparatus are provided. One embodiment of a protection device to protect an electronic apparatus includes:
a motion-detection device, to supply at least one alert signal in response to conditions of motion of the device;
a counter;
a first logic circuit, to increment the counter in the presence of a first value of the alert signal, in a first operating condition; and
a second logic circuit, to generate a protection signal on the basis of a count value of the counter;
wherein the first logic circuit is configured to decrement the counter in the presence of a second value of the alert signal, in the first operating condition.

One embodiment of method for protecting an electronic apparatus includes:
detecting conditions of motion of the electronic apparatus;
incrementing an index in the presence of the conditions of motion, in a first operating condition; and
generating a protection signal on the basis of the index;
said method including decrementing the index in the absence of the conditions of motion, in the first operating condition.

BRIEF DESCRIPTION OF THE SEVERAL VIEWS OF THE DRAWINGS

For a better understanding, some embodiments thereof are now described purely by way of non-limiting and non-exhaustive examples and with reference to the attached drawings, wherein:

FIG. 1b is a simplified block diagram of one embodiment of the apparatus of FIG. 1a;

FIG. 2 is a more detailed block diagram of a protection device incorporated in the apparatus of FIGS. 1a and 1b and made according to a first embodiment of the present invention;

FIGS. 4 and 5 are example truth tables corresponding to respective logic circuits of FIG. 3 according to one embodiment;

FIGS. 6a-6c are graphs that show example quantities corresponding to the protection device of FIG. 2 according to one embodiment;

FIG. 7 is a block diagram of a protection device that can be incorporated in the apparatus of FIGS. 1a and 1b and is made according to a second embodiment of the present invention;

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1B:
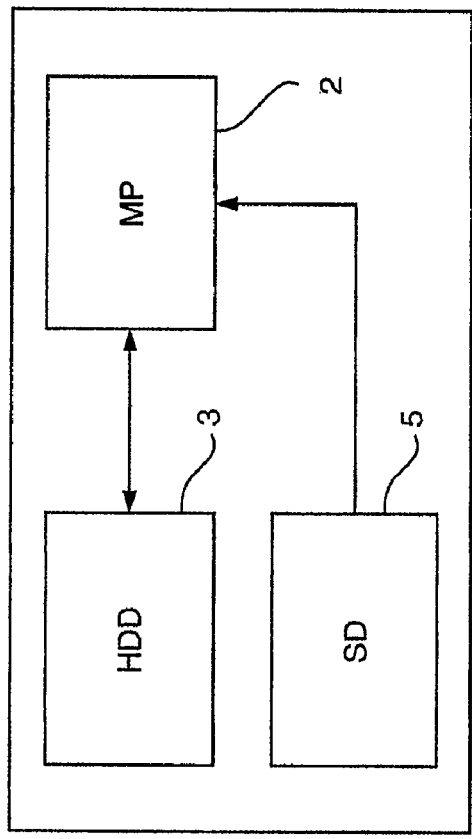
Figure 1A:
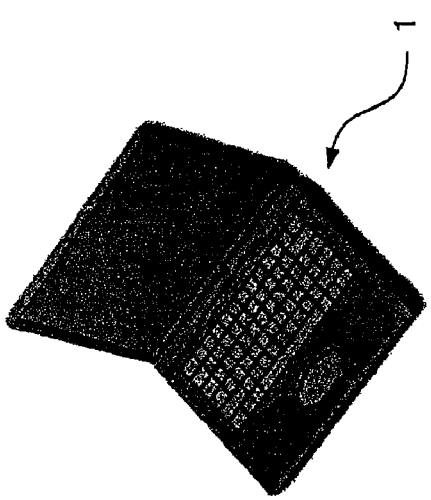
FIG. 1a is a simplified perspective view of an electronic apparatus of one embodiment.

FIGS. 1a and 1b are schematic illustrations of an embodiment of an electronic apparatus 1, in particular a portable computer, comprising a microprocessor 2, a hard-disk unit 3, and a protection device 5. The protection device 5 is based upon an inertial sensor (not shown herein) and generates an interrupt signal INT in response to pre-determined critical conditions of motion of the electronic apparatus 1 (e.g., free fall, rolling, etc.). The interrupt signal INT has an inactive value (value "0") and an active value (value "1") and is sent to the microprocessor 2, which reserves the maximum priority thereto and reacts immediately to the active value setting the hard-disk unit 3 in a protected configuration, in a way in itself known.

As is shown in greater detail in FIG. 2, the protection device 5 of one embodiment comprises an inertial sensor 7, a read interface 8, a processing module 9, and a protection module 10. In the embodiment described herein, the inertial sensor 7 is made in a first semiconductor chip 11, whilst the read interface 8, the processing module 9, and the protection module 10 are carried by a second semiconductor chip 12. Both of the semiconductor chips 11, 12 are then housed within a single packaging 13, which has at least one output terminal 15 and one input terminal 16, which are accessible from the outside.

The inertial sensor 7 is a MEMS (Micro-Electro-Mechanical System) sensor with three independent axes of detection, of a known type. In particular, the inertial sensor 7 is configured for detecting accelerations and forces acting on the electronic apparatus 1 according to a first axis X, a second axis Y, and a third Z that are mutually perpendicular. For example, the inertial sensor 7 can comprise a biaxial linear accelerometer and a uniaxial linear accelerometer made according to what is described in the documents Nos. EP-A-1365211, EP-A-1253399 or in U.S. Pat. No. 5,955,668.

The read interface 8 is coupled to the inertial sensor 7 and generates a first acceleration signal $A_X$, a second acceleration signal $A_Y$, and a third acceleration signal $A_Z$, in response to forces and accelerations detected by the inertial sensor 7 along the first, second, and third detection axes X, Y, Z, respectively. The read interface 8 is of a known type and, in the embodiment described herein, carries out the analog-to-digital conversion of the electrical quantities supplied by the inertial sensor 7. The first, second, and third acceleration signals $A_X, A_Y, A_Z$ are consequently in numeric format and are in a condition to be supplied to the processing module 9.

The processing module 9 is cascaded or otherwise coupled to the read interface 8 and uses the first, second, and third acceleration signals $A_X, A_Y, A_Z$ for generating a plurality of alert signals in response to detection of pre-determined conditions of motion of the electronic apparatus 1, indicating a risk of impact. The alert signals, in particular, switch from an inactive value ("0") to an active value ("1") in response to pre-determined configurations of the first, second, and third acceleration signals $A_X, A_Y, A_Z$, which arise when the electronic apparatus 1 is subjected to pre-determined critical conditions of motion. In the embodiment described herein, in particular, the alert signals generated by the processing module 9 comprise a free-fall signal $S_{FF}$ and a roll signal $S_R$ (also referred to hereinafter as "alert signals $S_{FF}, S_R$", for reasons of simplicity).

The free-fall signal $S_{FF}$ is generated when a so-called condition of "zero gravity" is detected, i.e., when the first, second, and third acceleration signals $A_X, A_Y, A_Z$ are all substantially zero. Alternatively, the processing module 9 calculates a total acceleration $A_T=\sqrt{A_X^2+A_Y^2+A_Z^2}$ and verifies when said total acceleration is substantially zero.

The roll signal $S_R$ is generated when, by combining the first, second, and third acceleration signals $A_X, A_Y, A_Z$, the processing module 9 detects a centrifugal acceleration.

The protection module 10 receives the alert signals, in the case in point the free-fall signal $S_{FF}$ and the roll signal $S_R$, and uses them for generating the interrupt signal INT according to a procedure that will be illustrated in detail hereinafter. The interrupt signal INT is made available on the terminal 15 for being acquired by the microprocessor 2. In addition, the protection module 10 is connected to the input terminal 16 so as to be programmed from the outside.

Figure 3:
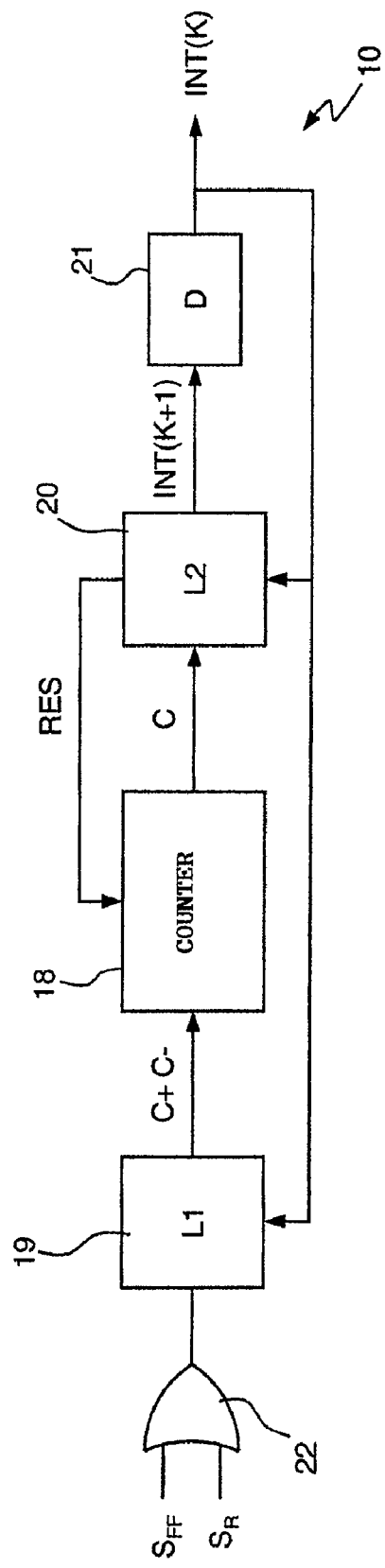
FIG. 3 is a more detailed block diagram of a part of the protection device of FIG. 2 according to one embodiment.
Figure 8:
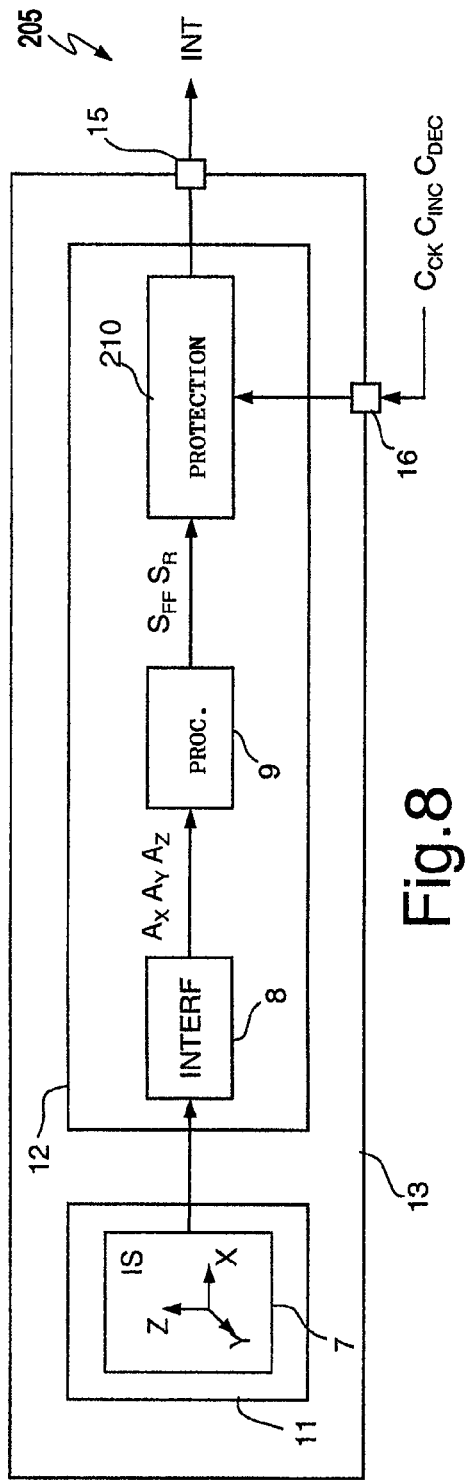
FIG. 8 is a block diagram of a protection device that can be incorporated in the apparatus of FIGS. 1a and 1b and is made according to a third embodiment of the present invention.

As is shown in FIG. 3, the protection module 10 of one embodiment comprises a counter 18, which supplies a count signal C, a first logic circuit 19 and a second logic circuit 20, and a memory element 21, for example, a bistable circuit of a D type.

The counter 18 is programmable and, for this purpose, is connected to the input terminal 16 so as to receive programming data from the outside. In particular, the counter 18 is configured so that a count clock $C_{CK}$, an increment step $C_{INC}$, and a decrement step $C_{DEC}$ (i.e., the amount by which the content of the counter 18 is incremented or, respectively, decremented at each count cycle) may be set from the outside. In particular, the count increment $C_{INC}$ and the count decrement $C_{DEC}$ are independent of one another and can be set at respective distinct values.

In the embodiment of the invention described herein, the first logic circuit 19 receives at input the free-fall signal $S_{FF}$ and the roll signal $S_R$ through an OR gate 22 (also other alert signals, not illustrated herein, can, however, concur in the OR gate 22). In addition, the first logic circuit 19 receives the current value of the interrupt signal INT (at a current cycle K) and generates a count-increment signal C+ and a count-decrement signal C−, for incrementing by an increment step $C_{INC}$ and decrementing by a decrement step $C_{DEC}$, respectively, the count value C stored in the counter 18. According to one embodiment, the count-increment signal C+ and the count-decrement signal C− are generated on the basis of the truth table shown in FIG. 4.

The second logic circuit 20, arranged downstream of the counter 18, uses the count value C and the current value of the interrupt signal INT (current cycle K) to determine a new value of the interrupt signal INT at a subsequent cycle K+1, as shown in the truth table of FIG. 5. In practice, the memory element 21 makes available the current value of the interrupt signal INT to the output 15, and the second logic circuit 20 supplies the new value of the interrupt signal INT that will have to be set in the memory element 21 at the cycle K+1. In addition, the second logic circuit 20 generates reset pulses RES that reset the counter 18 upon occurrence of given conditions, as explained in greater detail hereinafter.

Operation of the protection device 5 of one embodiment will now be described, with reference also to FIGS. 6a-6c.

When the interrupt signal INT is at the inactive value ("0"), the count value C stored in the counter 18 defines, in practice, an index of the risk correlated to protraction of the critical conditions of motion. If a pre-determined safety threshold $C_{INT}$ is reached, the interrupt signal INT switches to the active value ("1") upon command of the second logic circuit 20, to send a request for the electronic apparatus 1 to be immediately set in the safety configuration.

Initially, the counter 18 is reset (condition C=0 true, FIG. 4; in the third column of the truth table of FIG. 4, the value "1" indicates that the condition C=0 is verified, and the value "0" indicates that the condition C=0 is not verified). The interrupt signal INT, the free-fall signal $S_{FF}$, and the roll signal $S_R$ remain all inactive (value "0", second row of the truth table of FIG. 4, STOP) as long as the electronic apparatus 1 remains in conditions of rest.

When the electronic apparatus 1 is falling, the critical condition of motion is detected by the sensor 7, the interface 8, and the processing module 9, which switches at least one between the free-fall signal $S_{FF}$ and the roll signal $S_R$ to the active value ("1"). In this situation and as long as the critical state of motion remains, the first logic circuit 19 increments the counter 18 by using the count-increment signal C+ (third and fourth row of the truth table of FIG. 4; FIGS. 6a and 6b). In addition, the second logic circuit 20 maintains the interrupt signal INT at the inactive value (i.e., the value of the interrupt signal INT for the subsequent cycle K+1 is the inactive value "0"; see also the first row of the truth table of FIG. 5).

In particular, if the critical state of motion is prolonged until the counter 18 reaches the activation threshold $C_{INT}$, the second logic circuit sets the interrupt signal INT to the active value (the condition C=$C_{INT}$ is verified, and the active value "1" is selected for the interrupt signal INT in the subsequent cycle K+1, second row of the truth table of FIG. 5; event A, FIGS. 6a-6c). The electronic apparatus 1 is thus brought into the safety configuration.

The second logic circuit 20 moreover generates a reset pulse RES for resetting the counter 18 (C=0), which remains in the same state for the duration of the critical condition of motion, in which at least one between the free-fall signal $S_{FF}$ and the roll signal $S_R$ is at the active value (eighth row of the truth table of FIG. 4; event A, FIGS. 6a-6c).

When the critical state of motion ceases, all the alert signals $S_{FF}$, $S_R$ become inactive (value "0"). In this condition, in which the interrupt signal INT is still at the active value, the first logic circuit 20 starts incrementing the counter 18 again by using the count-increment signal C+ (fifth and sixth rows of the truth table of FIG. 4; event A, FIGS. 6a-6c).

The second logic circuit 20 maintains the interrupt signal INT at the active value ("1") until the counter 18 reaches a wait threshold $C_W$ (third and fourth rows of the truth table of FIG. 5, condition C=$C_W$ verified; event A, FIGS. 6a-6c). When the wait threshold $C_W$ is reached, the interrupt signal INT switches to the inactive value ("0"), and the counter 18 is reset by a new reset pulse RES.

Occasionally, it may happen that the warning of a critical condition of motion is interrupted for short time intervals, as in the case of the event B in FIGS. 6a-6c (the ensuing discussion will refer to said event B). As mentioned previously, the interruptions may, for example, be due to the fact that the electronic apparatus 1 has slipped out of the user's grip, and the user has made one or more unsuccessful attempts to stop its fall.

In this case, after the counter 18 has been reset, it is incremented by the first logic circuit 19 starting from the moment when the free-fall signal $S_{FF}$ and the roll signal $S_R$ indicate a critical condition of motion. In particular, the first logic circuit 19 sets the count-increment signal C+ to the active value ("1", third and fourth rows of the truth table of FIG. 4). The interrupt signal INT is kept at the inactive value in this step (first row of the truth table of FIG. 5).

In the example considered, the warning of a critical condition of motion is interrupted when the counter 18 has not yet reached the safety threshold $C_{INT}$. In the current situation (interrupt signal INT inactive, absence of critical conditions of motion on the basis of the alert signals $S_{FF}$, $S_R$, condition C=0 and condition C=$C_{INT}$ not yet verified), the first logic circuit 19 uses the count-decrement signal C− for decrementing the counter 18 gradually (first row of the truth table of FIG. 4). If the counter 18, following upon successive decrements, is set to zero, it remains in the condition C=0 until a new critical situation of motion is detected.

If the warning of critical conditions of motion starts again before the counter 18 is set to zero, the count resumes from the current count value $C_M$ (FIG. 6b; third row of the truth table of FIG. 4). In practice, the first logic circuit 19 starts incrementing the counter 18 again using the count-increment signal C+, and the new count value is C=$C_M$+$C_{INC}$ ($C_{INC}$ is the increment step set for the counter 18).

When the counter 18 reaches the safety threshold $C_{INT}$, the second logic circuit 20 sets the interrupt signal INT to the active value ("1", second row of the truth table of FIG. 5) and generates a reset pulse RES that resets the counter 18 (FIGS. 6a-6c).

As in the case of the event A, as long as at least one of the alert signals $S_{FF}$, $S_R$ is at the active value, the counter 18 remains fixed at the state C=0 (eighth row of the truth table of FIG. 4), and the interrupt signal INT remains at the active value (third row of the truth table of FIG. 5).

When the critical condition of motion is interrupted and all the alert signals $S_{FF}$, $S_R$ return to the inactive value, the first logic circuit 19 starts supplying the count-increment signal C+ again for incrementing the counter 18 (fifth and sixth row of the truth table of FIG. 4).

If the critical condition of motion starts again before the counter 18 reaches the wait threshold $C_W$, the first logic circuit 19 decrements the counter 18 by the count-decrement signal C− (seventh row of the truth table of FIG. 4).

As soon as the warning of critical conditions of motion is interrupted again, the first logic circuit 19 restarts incrementing the counter 18 (fifth row of the truth table of FIG. 4).

When the wait threshold $C_W$ is reached, the second logic circuit 20 imposes the inactive value on the interrupt signal INT (fourth row of the truth table of FIG. 5) and generates a reset pulse RES for resetting the counter 18.

In practice, the protection module 10 functions in two different modes in as many operating conditions, defined by the value of the interrupt signal INT. In a first operating condition, the interrupt signal INT has the inactive value, and the first logic circuit increments and decrements the counter 18 according to the value of the alert signals $S_{FF}$, $S_R$. More precisely, the counter 18 is incremented if at least one of the alert signals $S_{FF}$, $S_R$ has the active value and is decremented otherwise, as explained above. When the count value C reaches the safety threshold $C_{INT}$, the second logic circuit sets the interrupt signal INT to the active value, which defines the second operating condition of the protection module 10. In the second operating mode, the first logic circuit 19 increments the counter 18, when all the alert signals $S_{FF}$, $S_R$ have the inactive value, and decrements it, when at least one of the alert signals $S_{FF}$, $S_R$ has the active value. When the count value C reaches the wait threshold $C_W$, the interrupt signal INT switches to the inactive value as a result of the second logic circuit 20, and the protection module 10 returns into the first operating configuration.

The protection device according to various embodiments of the invention presents several advantages.

In the first place, timely recognition of conditions of potential danger of fall is favored, thanks to the fact that the count (i.e., the index of risk) is decremented gradually when the critical condition of motion is interrupted. In this way, short interruptions in a single step of fall are in practice neglected, because they do not cause resetting of the count, which resumes from a non-zero value if the critical condition of motion arises again. On the other hand, the time elapsed is sufficient to reset the count only when the preceding warning of critical conditions of motion has been caused by artifacts or brief displacements that are not in actual fact dangerous.

Another advantage resides in that the active value of the interrupt signal INT is maintained at least for the time necessary to carry out a count up to the wait threshold $C_W$. In particular, the wait threshold $C_W$ is chosen so as to guarantee that the interrupt signal INT will remain stable at the active value for a period sufficiently long to be correctly detected by the microprocessor 2. In this way, the electronic apparatus 1 can be brought into the safety configuration also when the warning of critical conditions of motion ceases immediately after the safety threshold $C_{INT}$ has been reached. Without the measure described, instead, switching of the interrupt signal INT could be too short to be detected by the microprocessor 2. Also decrementing the count for the wait threshold $C_W$ is advantageous, because it enables preservation of the safety configuration in conditions of danger, without delaying resumption of the normal operating configuration when the conditions of danger have ceased.

The protection device 5, and in particular the protection module 10, can be made directly in hardware with a reduced number of components. In the embodiment described above, there is moreover an optimization in exploitation of some components, which, like the counter 18, are used for different functions. Also the overall dimensions of the protection device 5 are hence modest.

In addition, precisely thanks to the contained dimensions and to the functional completeness, the protection device 5 is suited to be made as an autonomous device and to be provided in a single package separated from the main microprocessor 2 of the electronic apparatus 1. The protection device 5 operates in a way altogether independent of the microprocessor 2 and intervenes exclusively through the interrupt signal INT for requesting the electronic apparatus 1 to be put into the safety configuration. Hence, the protection device 5 does not occupy other system resources, and the microprocessor 2, which is freed from the task of surveying the state of motion, is available for the other functions of the electronic apparatus 1.

A further advantage derives from the fact that the protection device 5 can be readily programmed and is hence very versatile. In particular, it is possible to set different and independent rates of increment and decrement so as to adapt both the readiness of response and the sensitivity to interruptions in the critical conditions of motion to various uses.

In a second embodiment of the invention, illustrated in FIG. 7, in a protection device 105 for the electronic apparatus 1, the inertial sensor 7, the read interface 8, the processing module 9, and the protection module 10 are provided on a single semiconductor chip 111, which is, in turn, inserted inside the packaging 13.

A third embodiment of the invention is illustrated in FIGS. 8, 9 and 10a-10c. In this case, a protection device 205 for the electronic apparatus 1 comprises the inertial sensor 7, the read interface 8, the processing module 9, as described previously, and a protection module 210.

Figure 9:
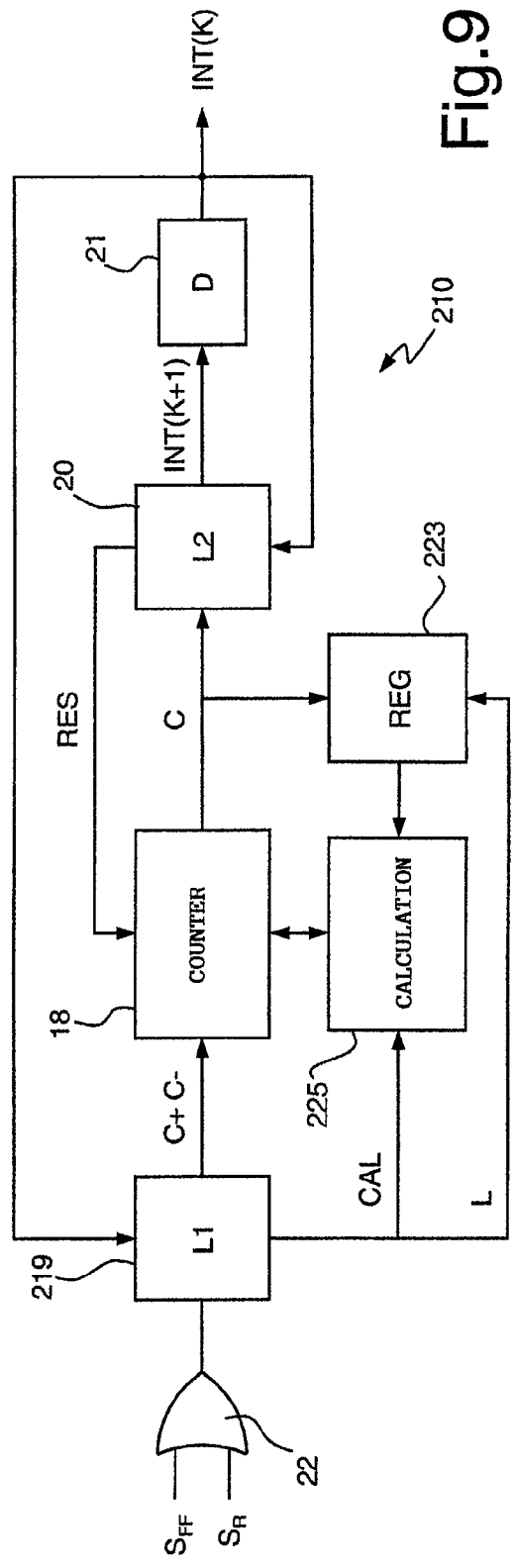
FIG. 9 is a more detailed block diagram of a part of the protection device of FIG. 8 according to one embodiment.
Figure 10A:
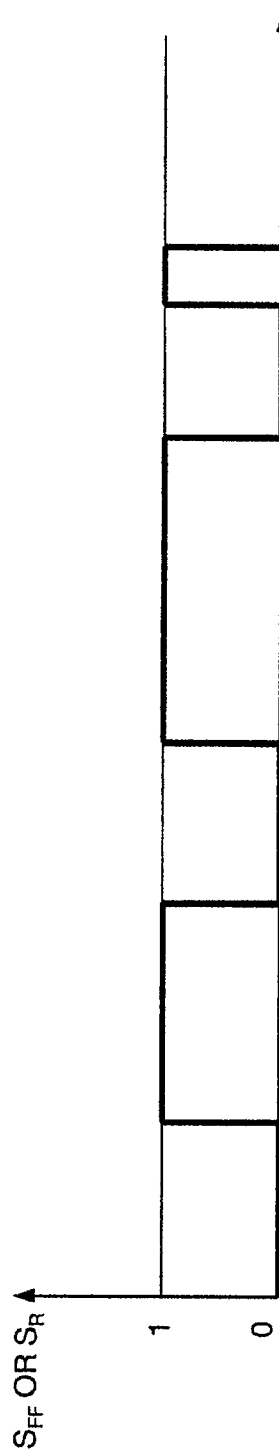
FIGS. 10a-10c are graphs that show example quantities corresponding to the protection device of FIG. 8 according to one embodiment.
Figure 10B:
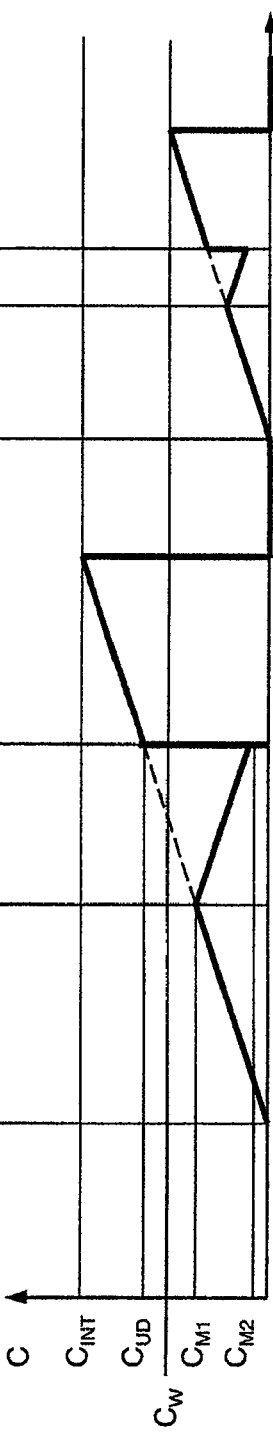
Figure 10C:
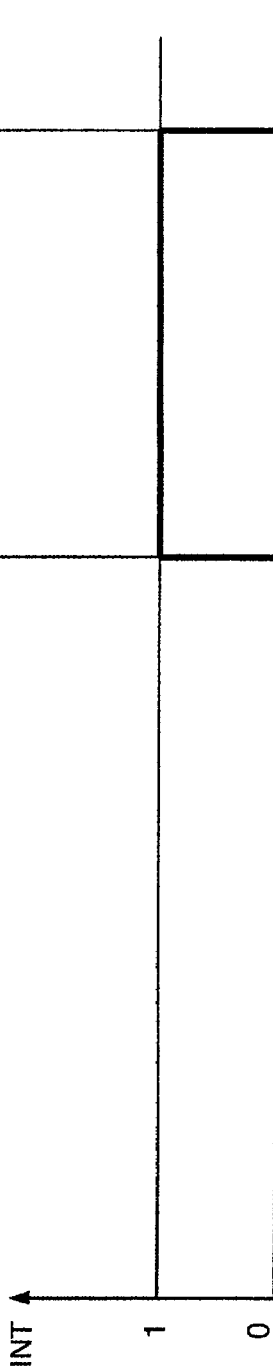

The protection module 210, which is shown in detail in FIG. 9, comprises the OR gate 22, the counter 18, a first logic circuit 219, the second logic circuit 20 and the memory element 21. In addition, the protection module 210 also comprises a register 223 and a calculation circuit 225.

The first logic circuit 219 controls the count of the counter 18, substantially like the first logic circuit 19 described previously. However, when a warning of critical conditions of motion is interrupted, the first logic circuit 219 loads a current count value $C_{M1}$ into the register 223, before starting decrementing the counter 18 (see also FIG. 10b). For this purpose a loading signal L is used. If the warning of critical conditions of motion starts again before the counter 18 is reset, the first logic circuit 219, before incrementing the counter 18, activates the calculation circuit 225 through a calculation signal CAL. The calculation circuit 225 acquires a current count value $C_{M2}$ (FIG. 10b) from the counter 18 and the count value $C_{M1}$ stored in the register 223, calculates an updated count value $C_{UD}$, and loads it in the counter 18. The updated count value $C_{UD}$ is given by $$C_{UD}=2C_{M1}-C_{M2}$$

Then, the first control circuit 219 starts incrementing the counter 18 again. In this way, in practice, the count resumes as if it had not been interrupted.

If the counter 18 is reset before the critical condition of motion starts again, also the register 223 is reset.

The same counting mechanism is used for restoring the inactive value of the interrupt signal INT, if the critical situation of motion is interrupted before the wait threshold $C_W$ is reached.

With just a modest increase in the circuit complexity and in the dimensions of the protection device 205, there is thus obtained a further improvement in the rapidity of response.

Finally, it is evident that modifications and variations can be made to the embodiments of the device and the method described herein, without thereby departing from the scope of the present invention, as defined in the annexed claims.

In particular, it is evident that one embodiment of the invention can be advantageously exploited for protecting electronic apparatuses of any type, not only portable computers.

Instead of being made directly in hardware, the protection module with all its components and possibly the processing module could be provided by a control unit appropriately programmed so as to carry out the logic operations of control and counting described above (for example, it is possible to use a digital signal processor or DSP).

It is then possible to use different combinations of alarm signals, in addition to the ones described.

Furthermore, it remaining understood that the counter is decremented step by step when a critical condition of motion is interrupted, different counting methods can be used. For example, in the case where the critical conditions of motion start again after a short interruption, the count can be resumed from the value reached before the interruption.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A protection device to protect an electronic apparatus, the protection device comprising:
   a motion-detection device, to supply at least one alert signal in response to conditions of motion of the protection device;
   a counter;
   a first logic circuit, to increment the counter in a presence of a first value of the alert signal, in a first operating condition; and
   a second logic circuit, to generate a protection signal on a basis of a count value of the counter;
   wherein the first logic circuit is configured to decrement the counter in a presence of a second value of the alert signal, in the first operating condition.

2. The device according to claim 1 wherein the first operating condition is defined by an inactive value of the protection signal.

3. The device according to claim 1 wherein the first logic circuit is configured to increment the counter iteratively by an increment step in the presence of the first value of the alert signal and to decrement the counter iteratively by a decrement step in the presence of the second value of the alert signal, in the first operating condition.

4. The device according to claim 3 wherein the increment step and the decrement step of the counter are programmable.

5. The device according to claim 1 wherein the second logic circuit is configured to switch the protection signal and to reset the counter if the count value has reached a first threshold, in the first operating condition.

6. The device according to claim 1 wherein the first logic circuit is configured to increment the counter in the presence of the second value of the alert signal and to decrement the counter in the presence of the first value of the alert signal, in a second operating condition.

7. The device according to claim 6 wherein the second operating condition is defined by an active value of the protection signal.

8. The device according to claim 6 wherein the second logic circuit is configured to switch the protection signal and to reset the counter if the count value has reached a second threshold, in the second operating condition.

9. The device according to claim 1 wherein the motion-detection device includes:
   an inertial sensor, to generate motion signals correlated to conditions of motion of the protection device; and
   a processing circuit, coupled to the inertial sensor to supply the alert signal in response to configurations of the motion signals.

10. The device according to claim 9 wherein the inertial sensor is a microelectromechanical sensor.

11. The device according to claim 1 wherein the motion-detection device, the counter, the first logic circuit, and the second logic circuit are housed in a single packaging, provided with a terminal to make the protection signal available externally.

12. An electronic apparatus, comprising:
   a microprocessor;
   a peripheral unit controlled by the microprocessor; and
   a safety device coupled to the microprocessor to supply a protection signal, the safety device including:
   a motion-detection device to supply at least one alert signal in response to a condition of motion;
   a counter coupled to said motion-detection device;
   a first logic circuit coupled to said counter, to increment the counter in response to a first value of the alert signal, in a first operating condition; and
   a second logic circuit coupled to said counter, to generate said protection signal based on a count value of the counter;
   wherein the first logic circuit is configured to decrement the counter in response to a second value of the alert signal, in the first operating condition.

13. The apparatus according to claim 12 wherein the microprocessor is configured to bring the peripheral unit into a safety configuration, in response to the protection signal.

14. The apparatus of claim 12 wherein the motion-detection device includes:
   an inertial sensor, to generate motion signals correlated to said condition of motion; and
   a processing circuit, coupled to the inertial sensor to supply the alert signal in response to particular configurations of the motion signals.

15. The apparatus of claim 14 wherein said microprocessor, peripheral unit, and safety device are part of a portable computer, and wherein said inertial sensor and said processing circuit are located on different semiconductor chips of said portable computer.

16. A method for protecting an electronic apparatus, the method comprising:
   detecting conditions of motion of the electronic apparatus;
   incrementing an index in a presence of the conditions of motion, in a first operating condition;
   generating a protection signal on a basis of the index; and
   decrementing the index in an absence of the conditions of motion, in the first operating condition.

17. The method according to claim 16 wherein the first operating condition is defined by an inactive value of the protection signal.

18. The method according to claim 16 wherein said incrementing includes incrementing the index iteratively by an increment step and said decrementing includes decrementing the index iteratively by a decrement step, in the first operating condition.

19. The method according to claim 18, further comprising programming the increment step and the decrement step.

20. The method according to claim 16, further comprising switching the protection signal and resetting the index, if the index has reached a first threshold, in the first operating condition.

21. The method according to claim 16, further comprising:
   decrementing the index in the presence of the conditions of motion, in a second operating condition; and
   incrementing the index in the absence of the conditions of motion, in the second operating condition.

22. The method according to claim 21 wherein the second operating condition is defined by an active value of the protection signal.

23. The method according to claim 22, further comprising switching the protection signal and resetting the index, if the index has reached a second threshold, in the second operating condition.

24. The method according to claim 16 wherein said detecting conditions of motion includes:

using an inertial sensor, to generate motion signals correlated to conditions of motion of the electronic apparatus; and supplying an alert signal in response to configurations of the motion signals.

25. The method according to claim 24 wherein the alert signal is a free-fall signal.

26. The method according to claim 24 wherein the alert signal is a roll signal.

27. An electronic apparatus, comprising:

means for detecting a condition of motion;

means for changing an index to increment said index in response to detected presence of said condition of motion, in a first operating condition; and means for generating a protection signal based on a value of the index, wherein said means for changing decrements the index in response detected absence of said condition of motion, in the first operating condition.

28. The apparatus of claim 27, further comprising:

a microprocessor; and a peripheral unit controlled by the microprocessor, wherein said processor is adapted to receive said protection signal to place said peripheral unit in a protective configuration.

29. The apparatus of claim 27 wherein said value of the index is a count value of a counter.

30. The apparatus of claim 27 wherein the first operating condition is defined by an inactive value of the protection signal.

* * * * *